Aug. 30, 1960   N. MOSTOVYCH ET AL   2,951,025
APPARATUS FOR ANODIZING ALUMINUM
Filed June 13, 1957

INVENTOR.
NICHOLAS MOSTOVYCH
ALEXANDER CYBRIWSKY
BY
Arthur H Robert
Atty.

United States Patent Office 2,951,025
Patented Aug. 30, 1960

2,951,025

APPARATUS FOR ANODIZING ALUMINUM

Nicholas Mostovych and Alexander Cybriwsky, Louisville, Ky., assignors to Reynolds Metals Company, Richmond, Va., a corporation of Delaware Filed June 13, 1957, Ser. No. 665,436

5 Claims. (Cl. 204—211)

This invention relates to an aluminum anodizing apparatus.

In electrolytically anodizing aluminum, it is well known that different properties or effects can be imparted to the anodized surface by the use of various types of current, such as sustained direct current, pulsating direct current, pure or symmetrical alternating current and alternating current having a direct current component. Consequently, it is useful in a commercial anodizing operation to have all of these types of current readily available for anodizing.

An object of this invention is to provide a compact unitary anodizing apparatus which will anodize with sustained D.C,. pulsating D.C., pure A.C., or A.C. having a D.C. component.

Other objects of this invention are: to provide a power supply particularly adaptable for a commercial anodizing operation; and to provide a transformer power supply which will supply large amounts of substantially sustained direct current for anodizing aluminum.

These objects are attained in an apparatus comprising: a polyphase alternating current transformer having a power terminal for each phase and a common or ground terminal; a plurality of electrolyte containing tanks, one for each power terminal and each adapted to hold a metal surface to be anodized; a rectifier connected in series between each tank and a respective power terminal; an electrical connection between each metal surface to be anodized and said ground terminal; and an electrical connection interconnecting all of said tanks together whereby a substantially direct current composed of a series of overlapping voltage impulses flows through each tank.

For providing each tank with a pulsating direct current of non-overlapping voltage impulses, a switch means is provided to open the electrical connection interconnecting the tanks together.

For providing each tank with an alternating current having a direct current component, a resistance is connected in parallel with each rectifier.

For providing a pure alternating current in each tank, means is provided to short circuit each rectifier and to open the electrical connection between said ground terminal and the metal surfaces to be anodized.

Figure 1:
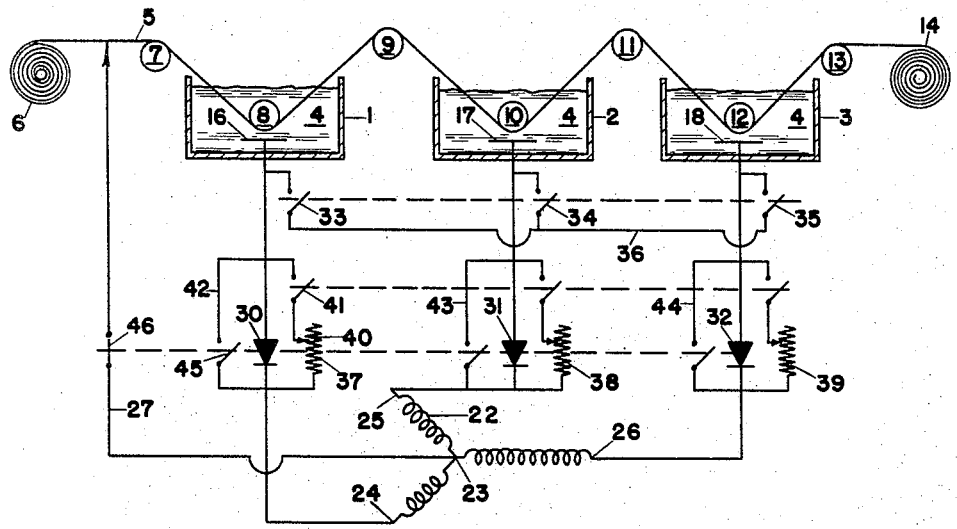

The invention is illustrated in the accompanying drawing wherein:

Fig. 1 is a schematic diagram of the anodizing apparatus of the present invention; and Figs. 2 to 5 illustrate the voltage waves of the different types of currents which may be obtained using the subject apparatus.

The anodizing apparatus illustrated in Fig. 1 includes a plurality of anodizing tanks designated as 1, 2 and 3, each containing a suitable anodizing electrolyte 4 such as dilute sulfuric acid. A strip 5 of aluminum to be anodized extends from a supply roll 6 respectively over and under guide rollers 7 to 13 through each of the anodizing tanks to a wind-up roll 14. Preferably the wind-up roll 14 is driven at a constant speed to pass the strip 5 through each of the anodizing tanks 1 to 3 at a desired speed. Each of the anodizing tanks 1 to 3 contains respective cathode electrodes 16 to 18 submerged in the electrolyte 4.

In order to supply the apparatus with power, a three phase transformer 20 is provided having a primary winding 21 connected to a suitable three phase power circuit and a secondary winding 22 having a common or ground terminal 23 and respective power terminals 24 to 26. The common terminal 23 of the secondary winding 22 is connected through a conductor 27 to the strip 5. The conductor 27 may be connected to the strip 5 by either a mechanical contact or an electrolytic contact.

Each of the respective cathode electrodes 16 to 18 of the tanks 1 to 3 is connected through respective rectifiers 30 to 32 to the respective power terminals 24 to 26 of the secondary winding 22. The rectifiers are arranged to allow current (electron flow) to flow from the power terminals to the cathodes and to oppose current flowing in the opposite direction. In addition each of the cathodes 16 to 18 is connected through respective switches 33 to 35 to a common bus bar 36. The switches 33 to 35 are interconnected for ganged operation. When the switches 33 to 35 are closed, each portion of the strip 5 immersed in the respective tanks is subjected to a substantially sustained direct current having the type of voltage wave illustrated in Fig. 2. When the switches 33 to 35 are open, each portion of the strip 5 immersed in the respective tanks is subjected to a pulsating direct current having the voltage wave illustrated in Fig. 3.

Each of the respective rectifiers 30 to 32 are connected in parallel with respective resistance circuits 37 to 39, each comprising an adjustable resistor 40 connected in series with a switch 41. The switches 41 of each resistance circuit are preferably interconnected for ganged operation. When the switches 33 to 35 are open and the resistance circuits 37 to 39 are closed, each portion of the strip 5 submerged in the respective anodizing tanks is subjected to an A.C. current with a direct current component having the voltage wave illustrated in Fig. 4. The resistors 40 may be adjusted so that the non-anodizing portion of the current in each tank will be very small while the anodizing portion of the current will be at a maximum.

Each of the rectifiers 30 to 32 is connected in parallel with respective shorting circuits 42 to 44, each of which contains a switch 45. The switches 45 are interconnected together for ganged operation. A switch 46 is provided in the conductor 27 and is interconnected to the switches 45 for ganged operation so that when switch 46 is closed, the switches 45 will be opened, and vice versa.

Figure 5:
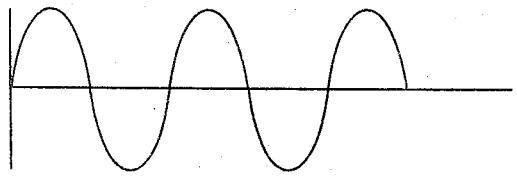

When the switches 33 to 35 are open and the switches 45 of the shorting circuits 42 to 44 are closed, thus opening the switch 46 of the conductor 27, the respective portions of the strip 5 immersed in the respective anodizing tanks will be subjected to a pure A.C. current having the voltage wave illustrated in Fig. 5. When operating with pure A.C. current the common terminal 23 of the transformer secondary winding 22 is disconnected from the strip 5 so that the tanks 1 to 3 will be connected in back-to-back fashion. In other words, each tank will be interconnected in series with each of the other tanks between its power terminals and the other power terminals.

Operation

Figure 2:
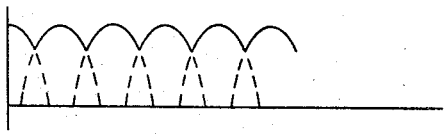
Figure 3:
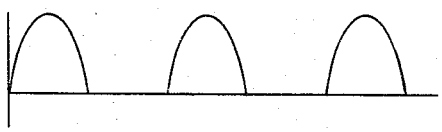
Figure 4:
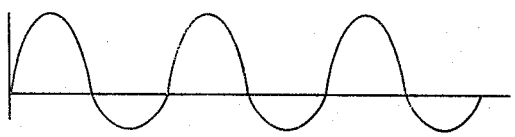

When it is desired to operate the described apparatus to provide a substantially sustained direct current, the resistance circuits 37 to 39 and the shorting circuits 42 to 44 are opened while the switches 33 to 35 are closed. By this connection, the cathodes 16 to 18 will be interconnected to each other and connected jointly through the rectifiers 30 to 32 to the power terminals 24 to 26. In this arrangement, each of the different phase pulses supplied from each of the power terminals 24 to 26 through the rectifiers 30 to 32 will appear on each of the cathode electrodes 16 to 18 as overlapped voltage pulses as seen in Fig. 2, thus providing each cathode electrode with a substantially sustained direct current.

The anodizing apparatus may be shifted to anodizing with a pulsating direct current, instead of a sustained direct current, by opening the switches 33 to 35. In this arrangement, each cathode electrode 16 to 18 will be interconnected through a single rectifier 32 to only one of the power terminals 24 to 26. As a result, each cathode electrode 16 to 18 will be interconnected through a single rectifier 32 to only one of the power terminals 24 to 26 and, as a result, each cathode electrode will be supplied with a pulsating direct current voltage which drops to zero between pulses.

When it is desired to shift the apparatus to anodizing with an alternating current having a large direct current component in the direction of anodizing, the resistance circuits 37 to 39 are closed by closing their switches 41. By this arrangement, a maximum anodizing current can flow from the power terminals 24 to 26, through the rectifiers 30 to 32, cathode electrodes 16 to 18, strip 5 and return through conductor 27 to common terminal 23, while the resistance circuits 37 to 39 in parallel with the rectifiers 30 to 32 limit the current flowing in the opposite direction to a desired minimum amount. This minimum current can be varied by adjusting the resistors 40 in the resistance circuits 37 to 39.

An alternating current having a direct current component is useful as a certain amount of non-anodizing current flowing through each tank is desirable to prevent burning the aluminum strip 5 when using large amounts of anodizing current. However, it is desirable to maintain the non-anodizing portion of the alternating current at the necessary minimum to prevent current wastage.

If it is desirable to anodize with a pure alternating current, the shorting circuits 42 to 44 are closed by closing their switches 45, the operation of which opens the switch 46 in the conductor 27. The tanks 1 to 3 are then connected in back-to-back fashion due to the opening of the conductor 27 extending between the strip 5 and the common terminal 23 of the transformer secondary winding 22.

It is preferable to interconnect the tanks in back-to-back fashion when anodizing with pure alternating current because of the rectifying properties of the aluminum being anodized. By rectifying properties, we mean that aluminum being anodized offers a high resistance to an anodizing current while offering a relatively lower resistance to a non-anodizing current. Therefore, when aluminum is anodized with an A.C. current, the non-anodizing portion of the A.C. current will be much larger than the anodizing portion of the A.C. current. By connecting the tanks 1 to 3 in back-to-back fashion, each power terminal 24 to 26 will be interconnected in series with a pair of anodizing tanks to each of the other power terminals.

Due to the different phases of current supplied by each of the power terminals 24 to 26, at least one of the cathode electrodes 16 to 18 will be maintained at an opposite polarity to one or both of the other cathode electrodes and, due to the back-to-back connection of the tanks, the current flowing through each tank will also flow through one or both of the other tanks. As a result, a non-anodizing portion of the alternating current flowing in one tank will flow through one or both of the other tanks as an anodizing current while the anodizing portion of the alternating current flowing through the same tank will flow through one or both of the other tanks as a non-anodizing current. This arrangement keeps the non-anodizing current portion of the alternating current flowing through each tank from rising to a wastefully high value which would be the result if the alternating current were allowed to flow through only one tank because of the rectifying properties of the aluminum being anodized.

Although applicants have described a three phase transformer for use in their apparatus, it is foreseen that other types of polyphase transformers could be used such as a six phase transformer.

Having described our invention, we claim:

1. An anodizing apparatus comprising: a polyphase alternating current power supply having a power terminal for each phase and a common ground terminal; a plurality of electrolyte-containing anodizing tanks, one for each phase, each having a cathode terminal and adapted to hold a metal surface to be anodized; connection means adapted to interconnect the metal surfaces to be anodized to said common ground terminal; a plurality of rectifiers, one for each phase, each connected to permit power to flow from a power terminal to the corresponding cathode terminal; and means electrically connecting the cathode terminals of the tanks together to cause said alternating current power supply to energize said tanks with direct current composed of overlapping impulses.

2. The apparatus of claim 1 including: switch means for opening said electrical connection means between each of said cathode terminals whereby each tank is energized with a rectified direct current composed of a series of non-overlapping pulses.

3. The apparatus of claim 2 including: a resistance interconnected in parallel with each of said rectifiers whereby each tank is energized with an alternating current having a direct current component.

4. The apparatus of claim 2 including: means for short circuiting each of said rectifiers; and means for opening the connection between said ground terminal and said metal surfaces to be anodized whereby each tank is energized with a pure alternating current.

5. An anodizing apparatus comprising: a polyphase alternating current power supply having a power terminal for each phase and a common ground terminal; a plurality of anodizing tanks, one for each phase, each being adapted to contain an electrolyte and a metal surface to be anodized and each having a cathode terminal; means electrically interconnecting said metal surfaces to provide a common anode terminal; a plurality of rectifiers one for each phase, each connected to permit power to flow in one direction between the power terminal for that phase and the corresponding cathode terminal; multi-circuit means providing a common electrical branch connection for interconnecting said common anode terminal to said common ground terminal, a common electrical branch connection for interconnecting the cathode terminals of the tanks together, a resistance bypass connection around each rectifier, and a short circuiting bypass connection around each rectifier; and switch means selectively operable, in one case, to close both of said common branch connections and open both of said bypass connections to cause said power supply to energize said tanks with direct current composed of overlapping impulses, in a second case, to close said anode-ground terminal connection and open the cathode branch connection and both of said bypass connections to energize each tank with a rectified direct current composed of non-overlapping pulses, in a third case, to close the anode-ground terminal and resistance bypass rectifier connections and open the cathode branch and short-circuiting bypass connections to energize each tank with an alternating current having a direct current component, and, in a fourth case, to open both common branch connections and close the short circuiting bypass connection to energize each tank with a symmetrical alternating current.

References Cited in the file of this patent

UNITED STATES PATENTS

| | | |
|---|---|---|
| 1,388,874 | Mershon | Aug. 30, 1921 |
| 1,785,389 | Piersol | Dec. 16, 1930 |
| 2,741,586 | Sherwood | Apr. 10, 1956 |